US012596473B2

(12) United States Patent
Lin et al.

(10) Patent No.: US 12,596,473 B2
(45) Date of Patent: Apr. 7, 2026

(54) TOUCH SCREEN AND IMAGE DISPLAY METHOD THEREOF

(71) Applicant: AmTRAN TECHNOLOGY CO., LTD, New Taipei City (TW)

(72) Inventors: He-Gang Lin, New Taipei City (TW); Che-Chia Ho, New Taipei City (TW); Yen-Chou Chen, New Taipei City (TW)

(73) Assignee: AmTRAN TECHNOLOGY CO., LTD, New Taipei City (TW)

( * ) Notice: Subject to any disclaimer, the term of this patent is extended or adjusted under 35 U.S.C. 154(b) by 0 days.

(21) Appl. No.: 18/642,852

(22) Filed: Apr. 23, 2024

(65) Prior Publication Data

US 2024/0377943 A1 Nov. 14, 2024

(30) Foreign Application Priority Data

May 8, 2023 (TW) .................................. 112116914

(51) Int. Cl.
*G06F 3/04886* (2022.01)
*G06F 3/01* (2006.01)
*G09B 5/02* (2006.01)

(52) U.S. Cl.
CPC .......... *G06F 3/04886* (2013.01); *G06F 3/011* (2013.01); *G06F 2203/04803* (2013.01); *G09B 5/02* (2013.01)

(58) Field of Classification Search
CPC ................. G06F 3/04886; G06F 3/011; G06F 2203/04803; G06F 3/0488; G06F 3/0425; G06F 3/04883; G06F 3/14; G09G 2340/14; G09G 2320/0686; B43L 1/04; B43L 1/10; B43L 1/16; G06V 10/25; G06V 10/26; G06V 10/267; G09B 5/02; H04N 9/3185
See application file for complete search history.

(56) References Cited

U.S. PATENT DOCUMENTS 8,519,971 B1 * 8/2013 Mackraz ............. G06F 3/04886
715/702
9,830,060 B2 11/2017 Leorin
(Continued)

FOREIGN PATENT DOCUMENTS

CN 105493023 A 4/2016
CN 113741760 A 12/2021
(Continued)

*Primary Examiner* — Temesghen Ghebretinsae
*Assistant Examiner* — Ivelisse Martinez Quiles
(74) *Attorney, Agent, or Firm* — Winston Hsu

(57) ABSTRACT

A touch screen includes a power supply unit, configured to supply power; an image capturing unit, configured to capture images; a storage unit, configured to temporarily store screen content; an image display unit, configured to display the screen content; and a processing unit, coupled to the power supply unit, the image capturing unit, the storage unit, and the image display unit, configured to execute an image display method. The image display method includes capturing an image of an area in front of the touch screen; determining a position of a speaker according to the image, and determining a blocked area and an unblocked area according to the position; and displaying screen content related to the blocked area in the unblocked area.

15 Claims, 12 Drawing Sheets

(56)  References Cited

U.S. PATENT DOCUMENTS

| | | | |
|---|---|---|---|
| 2006/0284850 A1* | 12/2006 | Tokkonen | G06F 3/0488 |
| | | | 345/173 |
| 2011/0234481 A1* | 9/2011 | Katz | H04N 9/31 |
| | | | 348/746 |
| 2013/0271395 A1* | 10/2013 | Tsai | G06F 3/041 |
| | | | 345/173 |
| 2015/0015495 A1* | 1/2015 | Narayanaswami | G06F 3/0488 |
| | | | 345/173 |
| 2015/0067552 A1* | 3/2015 | Leorin | G06F 3/04845 |
| | | | 715/765 |
| 2017/0269812 A1* | 9/2017 | Luo | G06F 3/0488 |
| 2020/0218335 A1* | 7/2020 | Soroker | G06F 3/167 |

FOREIGN PATENT DOCUMENTS

| | | |
|---|---|---|
| CN | 115767238 A | 3/2023 |
| JP | 2015-141519 | 8/2015 |
| TW | 202144986 A | 12/2021 |

* cited by examiner non-proportional scaling mode

FIG. 11C non-proportional scaling mode

FIG. 11B proportional scaling mode

FIG. 11A

TOUCH SCREEN AND IMAGE DISPLAY METHOD THEREOF

BACKGROUND OF THE INVENTION

1. Field of the Invention

The disclosure relates to a touch screen and an image display method thereof, and more particularly, to a touch screen and an image display method thereof that enhance the viewing experience.

2. Description of the Prior Art

Touch screens allow users to directly click, access and draw using their fingers or stylus, providing a more flexible and intuitive user experience. Large touch screens have become increasingly popular in conference rooms and classrooms, replacing traditional tools such as projectors, displays and whiteboards. The flexible operation of the large touch screens enhances audience engagement and understanding of the presenter's content.

However, just like the traditional tools, the speaker may physically obstruct the display when using large touch screens, which hinders some audience members' view of the content shown on the large touch screen or written by the speaker. This negatively impacts information reception or viewing experience. In the past, this issue was typically addressed by passively waiting for the speaker to move, but this also caused other audience members to be obstructed from receiving information. On the other hand, it is also possible to provide an additional display device to show the blocked content. However, this way not only increases costs but also requires additional space. Therefore, there is a need for improvement in this art.

SUMMARY OF THE INVENTION

Therefore, the disclosure provides a touch screen and a method that uses the flexibility of display of the touch screen and combines with a camera to detecting the speaker's position, so as to allow listeners to see content that is blocked by the speaker, thereby improving the quality of meetings and teaching.

An embodiment of the disclosure discloses an image display method for a touch screen. The image display method comprises capturing an image of an area in front of the touch screen; determining a position of a speaker according to the image, and determining a blocked area and an unblocked area according to the position; and displaying screen content related to the blocked area in the unblocked area.

An embodiment of the disclosure further discloses a touch screen. The touch screen comprises a power supply unit, an image capturing unit, a storage unit, an image display unit and a processing unit. The power supply unit is configured to supply power. The image capturing unit is configured to capture images. The storage unit is configured to temporarily store screen content. The image display unit is configured to display the screen content. The processing unit is coupled to the power supply unit, the image capturing unit, the storage unit, and the image display unit, and is configured to execute an image display method. The image display method comprises capturing an image of an area in front of the touch screen; determining a position of a speaker according to the image, and determining a blocked area and an unblocked area according to the position; and displaying screen content related to the blocked area in the unblocked area.

These and other objectives of the disclosure will no doubt become obvious to those of ordinary skill in the art after reading the following detailed description of the preferred embodiment that is illustrated in the various figures and drawings.

BRIEF DESCRIPTION OF THE DRAWINGS

FIG. 11A, FIG. 11B and FIG. 11C are embodiments of executing the screen processing process when the blocked area is a middle area.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
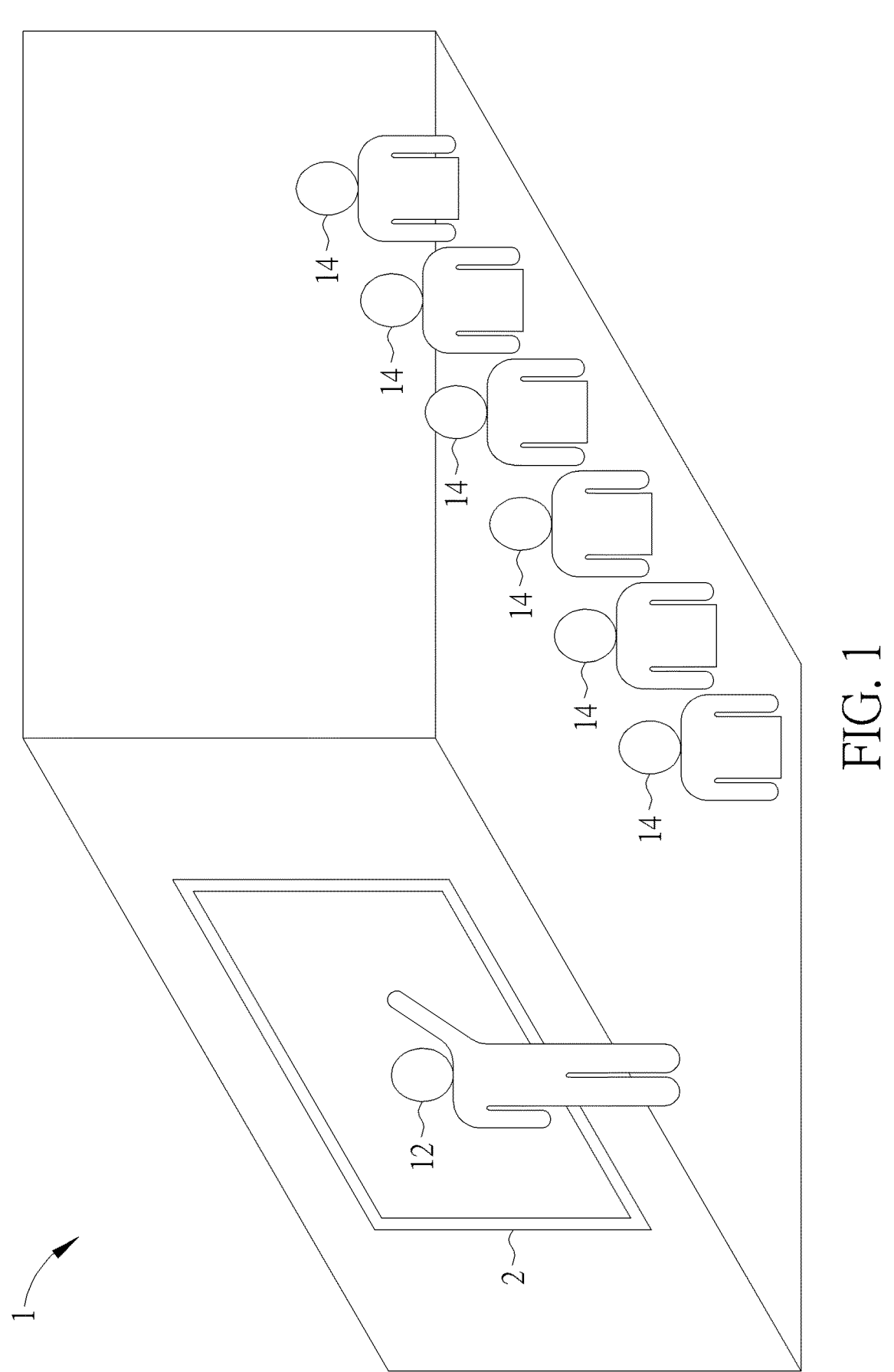
FIG. 1 is a schematic diagram of a scenario according to an embodiment of the disclosure.

Please refer to FIG. 1, which is a schematic diagram of a scenario 1 according to an embodiment of the disclosure. The scenario 1 may be teaching, conference, or presentation, and is not limited thereto. In the scenario 1, a speaker 12 uses a touch screen 2 to perform a speech to a plurality of listeners 14. The touch screen 2 may be a large touch display, and the speaker 12 may play video or images relevant to the speech content through the touch screen 2, or directly perform related operations such as writing, drawing, or screen control on the touch display panel of the touch screen 2. When the speaker 12 operates the touch screen 2, the body of the speaker 12 can inevitably cover a part of the display of the touch screen 2, resulting in some listeners 14 being unable to see the screen content of the blocked area, especially the content that the speaker 12 is operating. In this situation, some listeners 14 may not fully receive the information conveyed by the speaker 12, which affects the viewing experience.

In order to enhance the viewing experience, the disclosure obtains the position of the speaker 12 through an image capturing unit and determines the blocked screen area of the screen 2 according to the position of the speaker 12. Accordingly, the screen content of the blocked screen area may be displayed on the unblocked area through the picture-in-picture (PIP) technology, so as to avoid the listener 14 missing important information. The image capturing unit may be a built-in or external camera, video camera, image sensor, etc. connected to the touch screen 2, and is not limited thereto. The setting position of the built-in image capturing unit is preferably the upper border of the touch screen, and the setting position of the external image capturing unit is preferably directly in front of or above the touch screen, but not limited thereto. As long as the camera lens is able to fully capture the horizontal range of the touch screen in the front area of the touch screen, the setting position of the image capturing unit may be used to implement embodiments of the disclosure.

Figure 2:
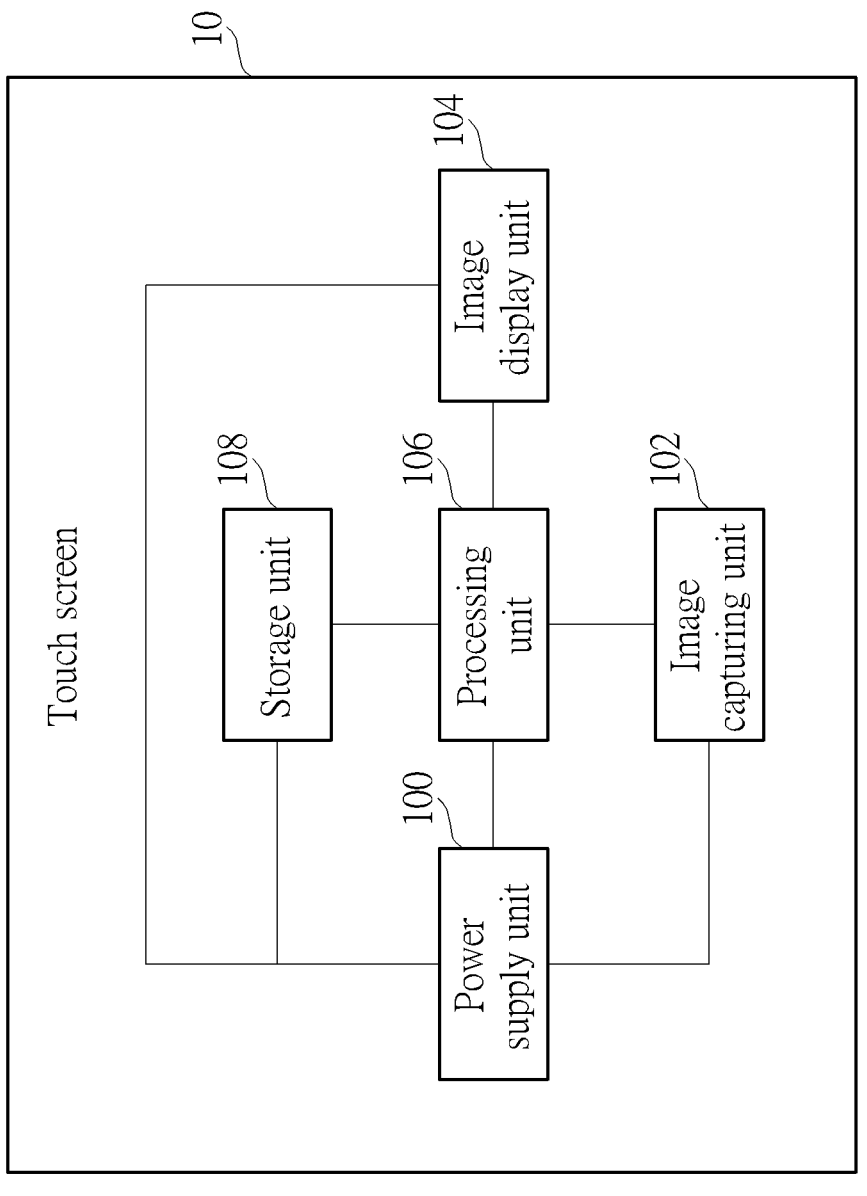
FIG. 2 is a schematic diagram of a touch screen according to an embodiment of the disclosure.

In detail, please refer to FIG. 2, which is schematic diagram of a touch screen 10 according to an embodiment of the disclosure. The touch screen 10 may replace the touch screen 2 of FIG. 1 and may be applied to the scenario 1. The touch screen 10 comprises a power supply unit 100, an image capturing unit 102, an image display unit 104, a processing unit 106 and a storage unit 108. The processing unit 106 is coupled to the image capturing unit 102, the image display unit 104 and the storage unit 108. The power supply unit 100 is coupled to all operating units of the touch screen 10 and supplies power thereto. The image capturing unit 102 may be built-in or external to the touch screen for capturing images of an area in front of the touch screen 10 to determine the position of the speaker 12. When the image capturing unit 102 is externally connected to the touch screen 10, the image capturing unit 102 may be an external camera set up anywhere in the meeting or teaching space and may be wired or wirelessly coupled to the touch screen 10. The image display unit 104 may be a touch display panel used for presenting the screen content. The processing unit 106 may be a general-purpose processor, a microprocessor, an application specific integrated circuit (ASIC) or a combination thereof, and is used for analyzing the content of the images captured by the image capturing unit 102, performing image processing and further controlling the image display unit 104 to present the processed images. The storage unit 108 may be any data storage device, which is used to store program codes, data and related images for executing the method of the embodiment of the disclosure. For example, the storage unit 108 may be a flash memory, a random access memory (RAM), a hard disk, an optical data storage device or a non-volatile storage unit, etc., but is not limited thereto.

Figure 3:
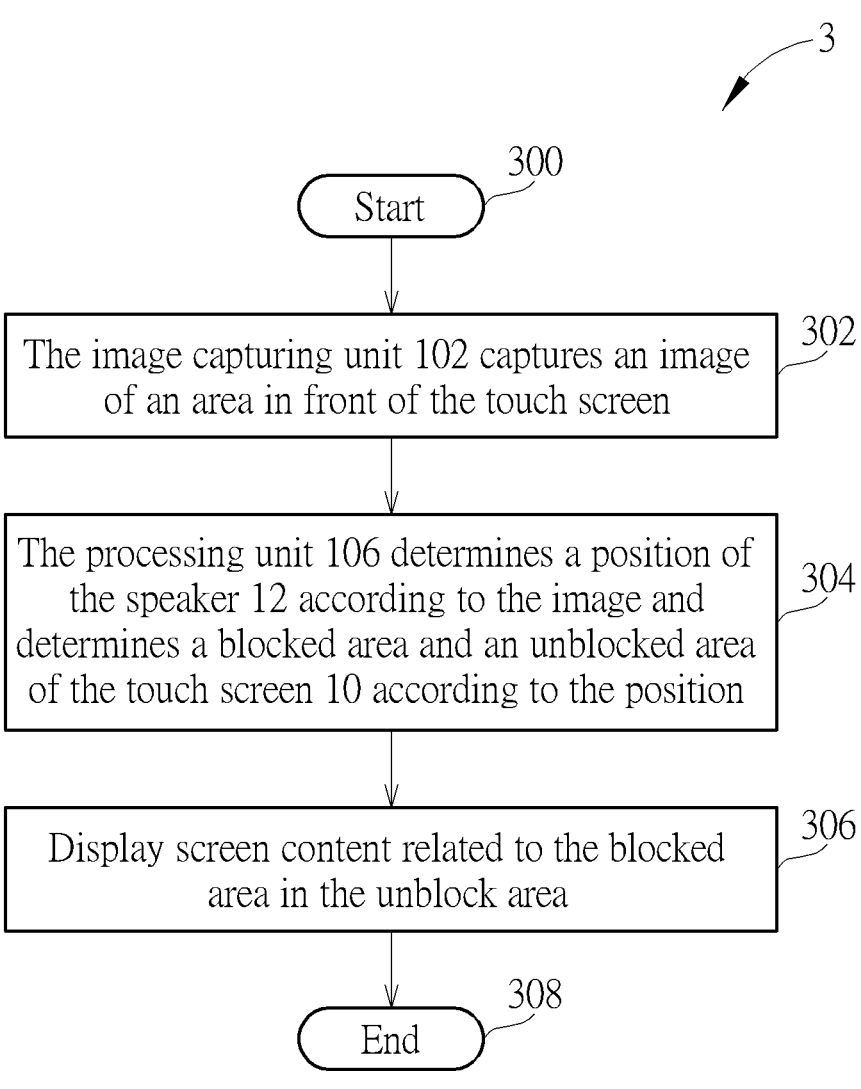
FIG. 3 is a schematic diagram of an image display process according to an embodiment of the disclosure.

Regarding the operations of the touch screen 10, please refer to FIG. 3, which is a schematic diagram of an image display process 3 according to an embodiment of the disclosure. The image display process 3 may be complied into one or more program codes and stored in the storage unit 108 to control the operations of the touch screen 10. The image display process 3 comprises the following steps:

Step 300: Start.

Step 302: The image capturing unit 102 captures an image of an area in front of the touch screen.

Step 304: The processing unit 106 determines a position of the speaker 12 according to the image and determines a blocked area and an unblocked area of the touch screen 10 according to the position.

Step 306: Display screen content related to the blocked area in the unblock area.

Step 308: End.

According to the image display process 3, in Step 302, the touch screen 10 first captures an image of an area in front of the touch screen 10 through the image capturing unit 102. Next, in Step 304, the processing unit 106 determines a position of the speaker 12 according to the image obtained in Step 302, and determines the blocked area and the unblocked area of the touch screen 10 according to the position of the speaker 12. Finally, in Step 306, the processing unit 106 adopts picture-in-picture (PIP) technology to combine the screen contents of the blocked area and the unblocked area, and displays on the image display unit 104. Accordingly, the screen content blocked by the speaker 12 may be flexibly presented in the unblocked area of the touch screen 10 and thereby ensure that the important information on the screen is completely obtained by the listener 14.

Specifically, in Step 302, the touch screen 10 captures the image of the front area through the image capturing unit 102 so as to obtain the position of the speaker 12. The angle of view for the image capturing unit 102 is not limited to a specific orientation, but should be ensured that the range of the image captured by the image capturing unit 102 at least covers the left edge and the right edge of the touch screen 10 in the horizontal direction.

Figure 4:
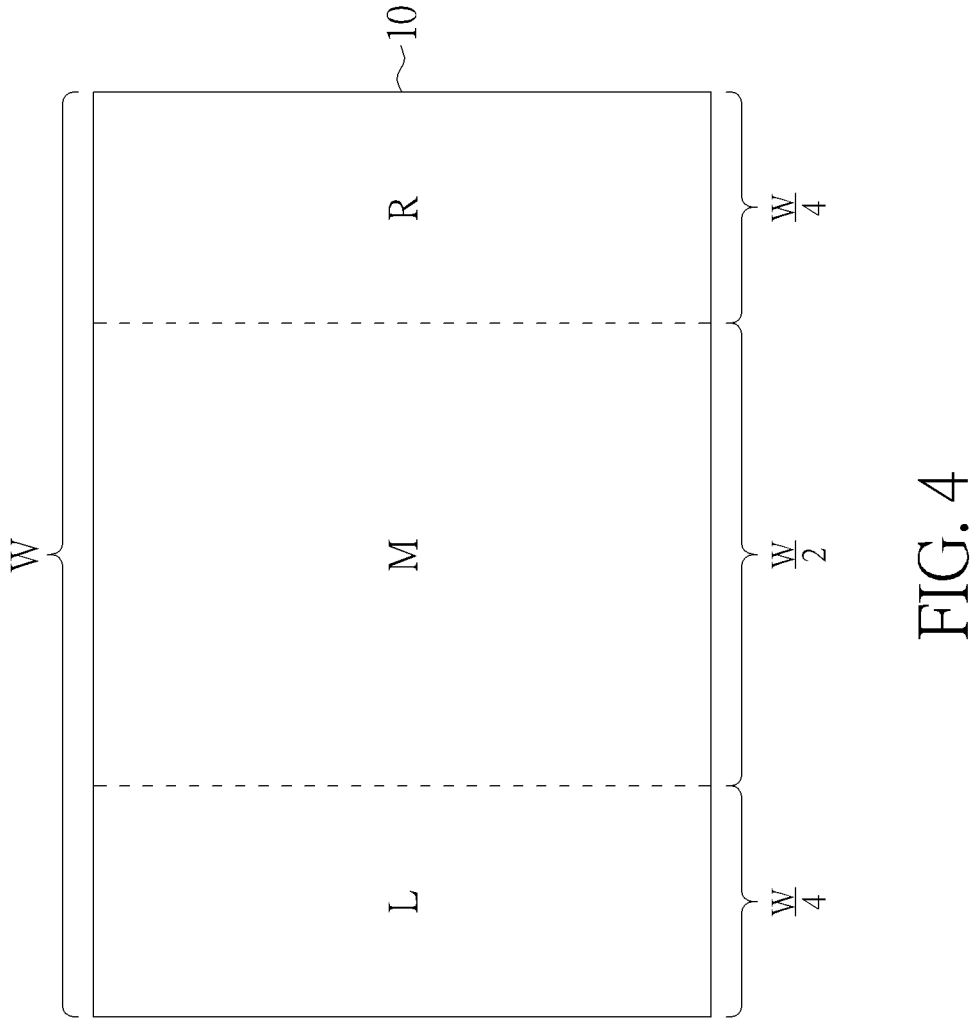
FIG. 4 is a schematic diagram of a screen partition according to an embodiment of the disclosure.

In Step 304, the touch screen 10 may determine the position of the speaker 12 according to the image captured in Step 302, and may determine the blocked area and the unblocked area of the screen according to the position of the speaker 12. For example, please refer to FIG. 4, which is a schematic diagram of a screen partition of the touch screen 10 according to an embodiment of the disclosure. As shown in FIG. 4, the screen of the touch screen 10 may be divided into three areas in the horizontal direction based on the screen width W: a left area L, a middle area M and a right area R. In this embodiment, the widths of the left area L and the right area R are a quarter of the screen width W (i.e., W/4), the width of the middle area M is a half of the screen width W (i.e., W/2), and is not limited thereto. The processing unit 106 determines one of the left area L, the middle area M and the right area R to be the blocked area according to the position of the speaker 12 in the image captured in Step 302, and determines the remaining areas to be the unblocked areas.

Figures 5A, 5B, 5C:
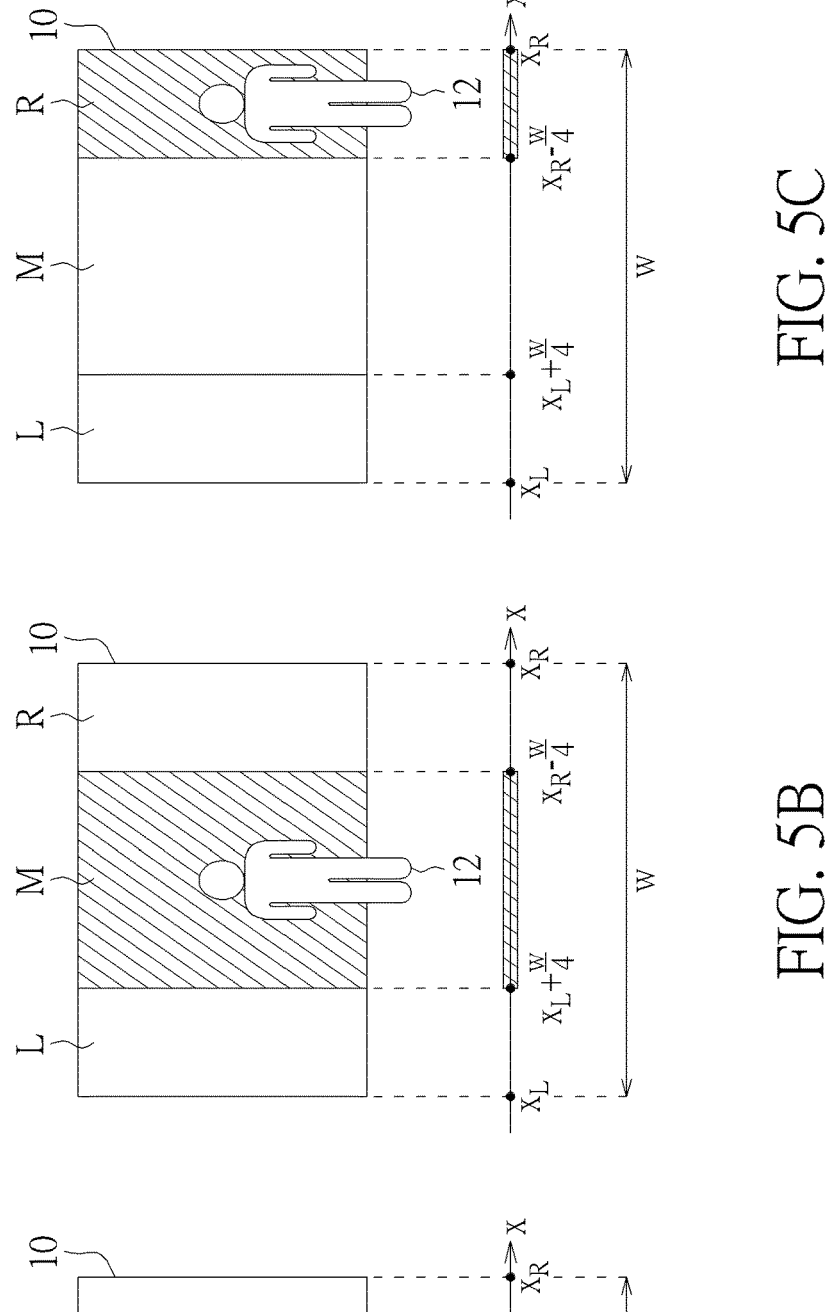
FIG. 5A, FIG. 5B and FIG. 5C are schematic diagrams of determining a blocked area according to the position of a speaker according to an embodiment of the disclosure.

Please continue to refer to FIG. 5A-5C, which are schematic diagrams of the processing unit 106 determining the blocked area according to the position of the speaker 12. Assuming that the coordinates of the left edge and the right edge of the touch screen 10 on the x-axis in the horizontal direction of the image are $x_L$ and $x_R$ respectively, then the horizontal width w of the screen in the image is $x_R - x_L$. According to the width of the left area L, the middle area M, and the right area R, the x-axis may be divided into three intervals, which are a left interval $$\left[ x_L, x_L + \frac{w}{4} \right]$$

corresponding to the left area L, a middle interval

$$\left[x_L + \frac{w}{4}, x_R - \frac{w}{4}\right]$$

corresponding to the middle area M, and a right interval $$\left[x_R - \frac{w}{4}, x_R\right]$$

corresponding to the right area R. In Step 304, the processing unit 106 may first perform a human detection according to the image captured in Step 302. If no human is detected, the touch screen 10 may be determined to be in an unblocked state, and there is no need to modify the screen content. If a human is detected, it is able to further calculate the ratios of the three intervals to the area of the human respectively based on the coordinates and area of the human for determining the blocked area. As shown in FIG. 5A, when detecting that the human-shaped area of the speaker 12 falls substantially in the left interval, the processing unit 106 determines that the blocked area is the left area L, and the unblocked area includes the middle area M and the right area R; when detecting that the human-shaped area of the speaker 12 falls substantially in the middle interval, the processing unit 106 determines that the blocked area is the middle area M, and the unblocked area includes the left area L and the right area R; and when detecting that the human-shaped area of the speaker 12 falls substantially in the right interval, the processing unit 106 determines that the blocked area is the right area R, and the unblocked area includes the left area L and the middle area M. It should be noted, the image capturing unit 102 is mainly used to capture the image of the speaker 12, and the captured image may not include the body or screen of the touch screen 10. In other embodiments, the coordinates $x_L$ and $x_R$ of the left edge and the right edge of the touch screen 10 on the x-axis in the horizontal direction of the image may be obtained through setup, and are not limited thereto.

Next, in Step 306, the processing unit 106 may further process the screen content according to the blocked area and the unblocked area determined in Step 304, and preferably display the screen content on the image display unit 104 through PIP. In an embodiment, the disclosure may perform different image processing according to the different blocked areas. In addition, the screen processing method may be further divided into two scaling modes, which are proportional scaling mode and non-proportional scaling mode. The proportional scaling mode is to perform a uniform scaling that maintains the original aspect ratio of the screen, which may avoid the distortion of the screen content. The non-proportional scaling mode may fill the unblocked area to make a full use of the display area.

Figure 6:
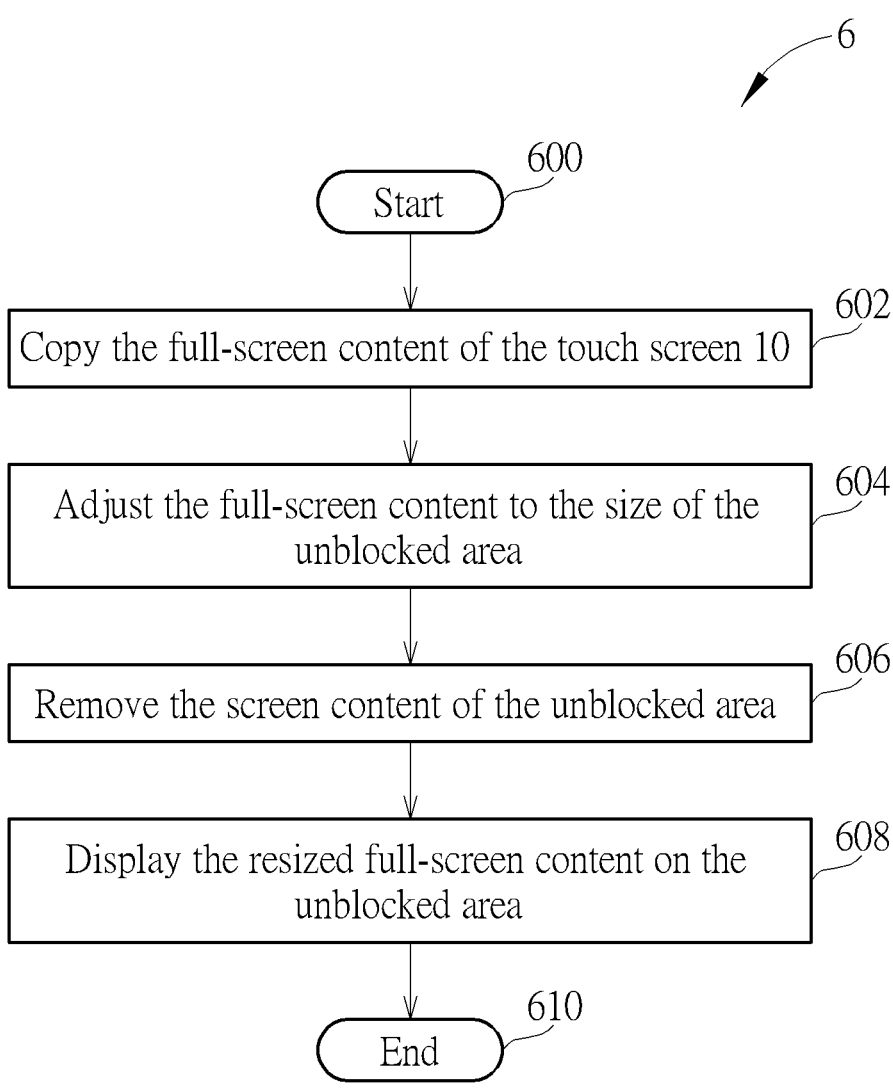
FIG. 6 is a schematic diagram of a screen processing process according to an embodiment of the disclosure.

For example, please refer to FIG. 6, which is a schematic diagram of a screen processing process 6 according to an embodiment of the disclosure. The screen processing process 6 is used in the touch screen 10 for further processing the screen content when the blocked area is the left area L or the right area R. The screen processing process 6 may be compiled into a program code and stored in the storage unit 108 to be executed by the processing unit 106, which comprises the following steps:

Step 600: Start.

Step 602: Copy the full-screen content of the touch screen 10.

Step 604: Adjust the full-screen content to the size of the unblocked area.

Step 606: Remove the screen content of the unblocked area.

Step 608: Display the resized full-screen content on the unblocked area.

Step 610: End.

According to the screen processing process 6, the processing unit 106 first copies the full-screen content displayed on the touch screen 10 to the storage unit 108 (Step 602), and adjusts the copied full-screen content to a desired size (Step 604). Next, the processing unit 106 removes the original screen content in the unblocked area (Step 606), and displays the resized full-screen content in the unblocked area through PIP (Step 608).

Figure 7:
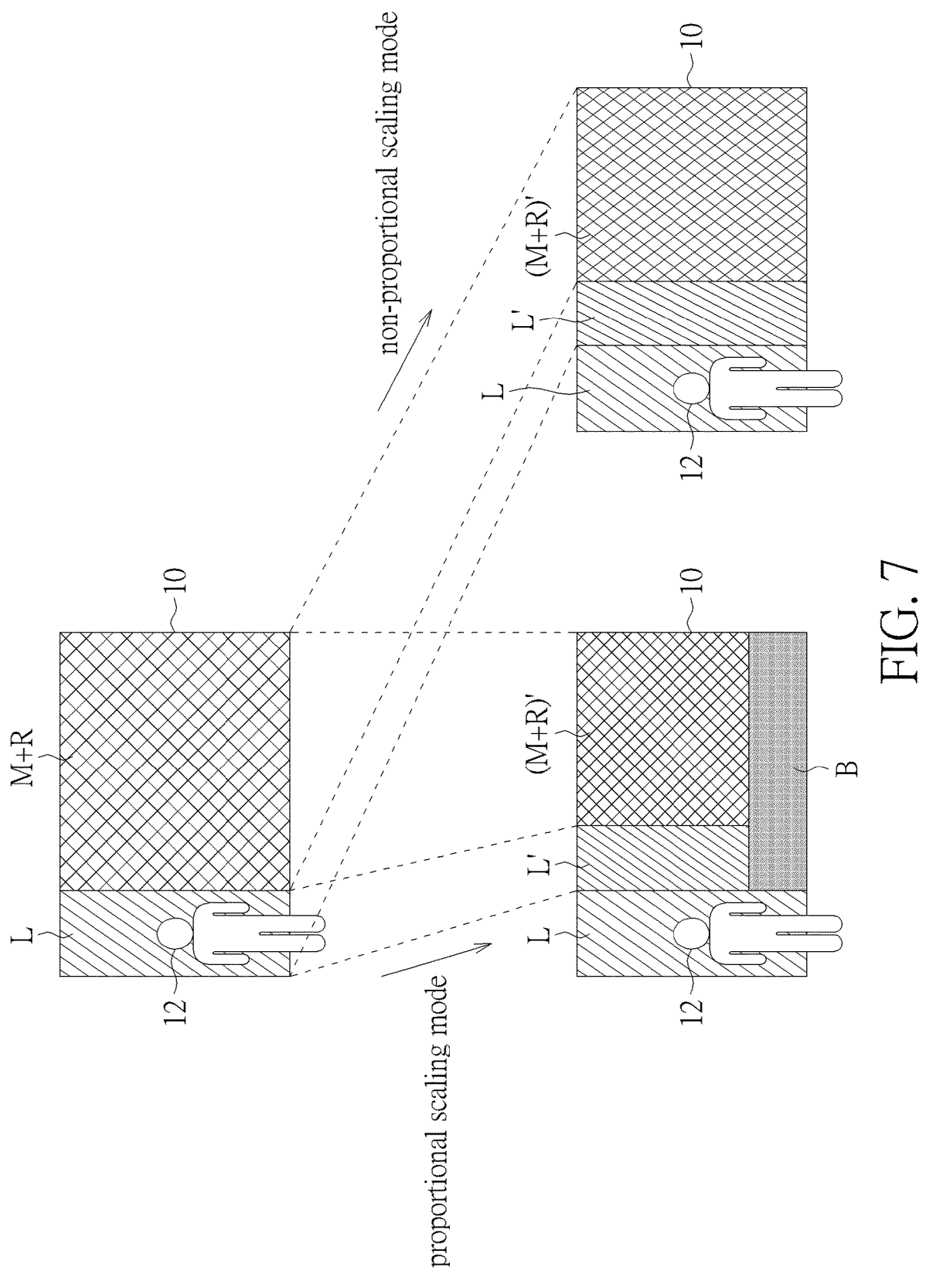
FIG. 7 is an embodiment of executing the screen processing process when the blocked area is a left area.

Specifically, please refer to FIG. 7, which is an embodiment of the processing unit 106 executing the screen processing process 6 when the blocked area is the left area L. As shown in FIG. 7, when the blocked area is the left area L, the unblocked area includes the middle area M and the right area R, and are presented as M+R in FIG. 7. In Step 602, when the screen processing method is the proportional scaling mode, the processing unit 106 maintains the aspect ratio of the copied full-screen content for uniform scaling according to the size of the unblocked area M+R, and leaves the redundant area black (in this example, the black area is located at the bottom of the screen; however, the black area also may be on the top or distributed to the top and bottom of the screen, and is not limited thereto). When the screen processing method is the non-proportional scaling mode, the processing unit 106 scales the copied full-screen content to fit the size of the unblocked area M+R to fill the unblocked area M+R. Accordingly, through PIP, the embodiment of the disclosure may retain the screen content of the blocked area L that the speaker 12 is operating on, to avoid affecting the operation. Furthermore, the screen content of the blocked area L and the screen content of the unblocked area M+R may be displayed in the unlocked area M+R, so as to ensure that the listener 14 can fully see the screen content projected by the speaker 12 through the touch screen 10.

Figure 8:
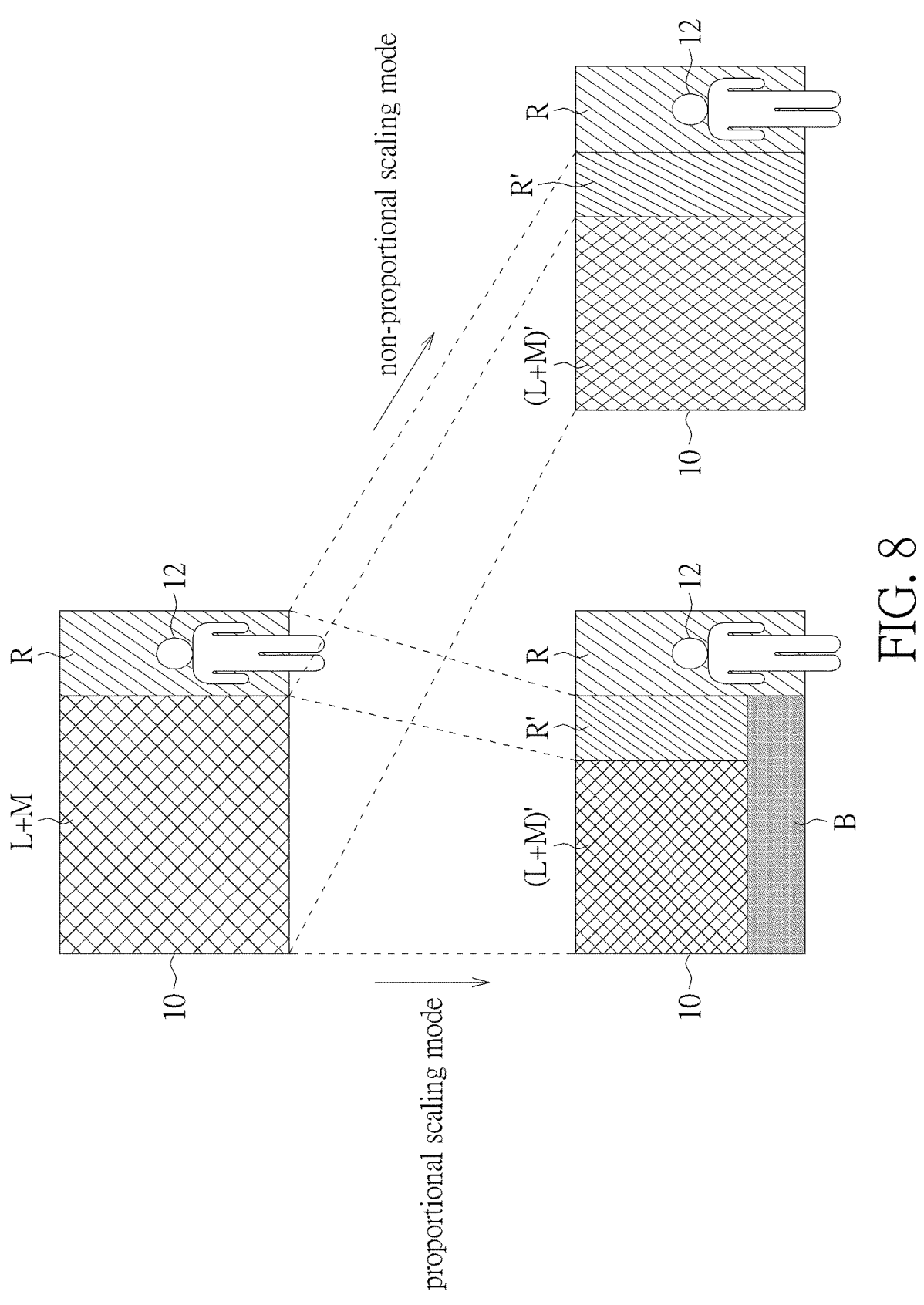
FIG. 8 is an embodiment of executing the screen processing process when the blocked area is a right area.

Please refer to FIG. 8, which is an embodiment of the processing unit 106 executing the screen processing process 6 when the blocked area is the right area R. As shown in FIG. 8, when the blocked area is the right area R, the unblocked area includes the left area L and the middle area M, and is presented as L+M in FIG. 8. In Step 602, when the screen processing method is the proportional scaling mode, the processing unit 106 maintains the aspect ratio of the copied full-screen content for uniform scaling according to the size of the unblocked area L+M, and leaves the redundant area black (in this example, the black area is located at the bottom of the screen; however, the black area also may be on the top or distributed to the top and bottom, and is not limited thereto). When the screen processing method is the non-proportional scaling mode, the processing unit 106 scales the copied full-screen content to fit the size of the unblocked area L+M to fill the unblocked area L+M. Accordingly, through PIP, the embodiment of the disclosure may retain the screen content of the blocked area R that the speaker 12 is operating on, to avoid affecting the operation. Furthermore, the screen content of the blocked area R and the screen content of the unblocked area L+M may be displayed in the unlocked area L+M, so as to ensure that the listener 14 can fully see the screen content projected by the speaker 12 through the touch screen 10.

Figure 9:
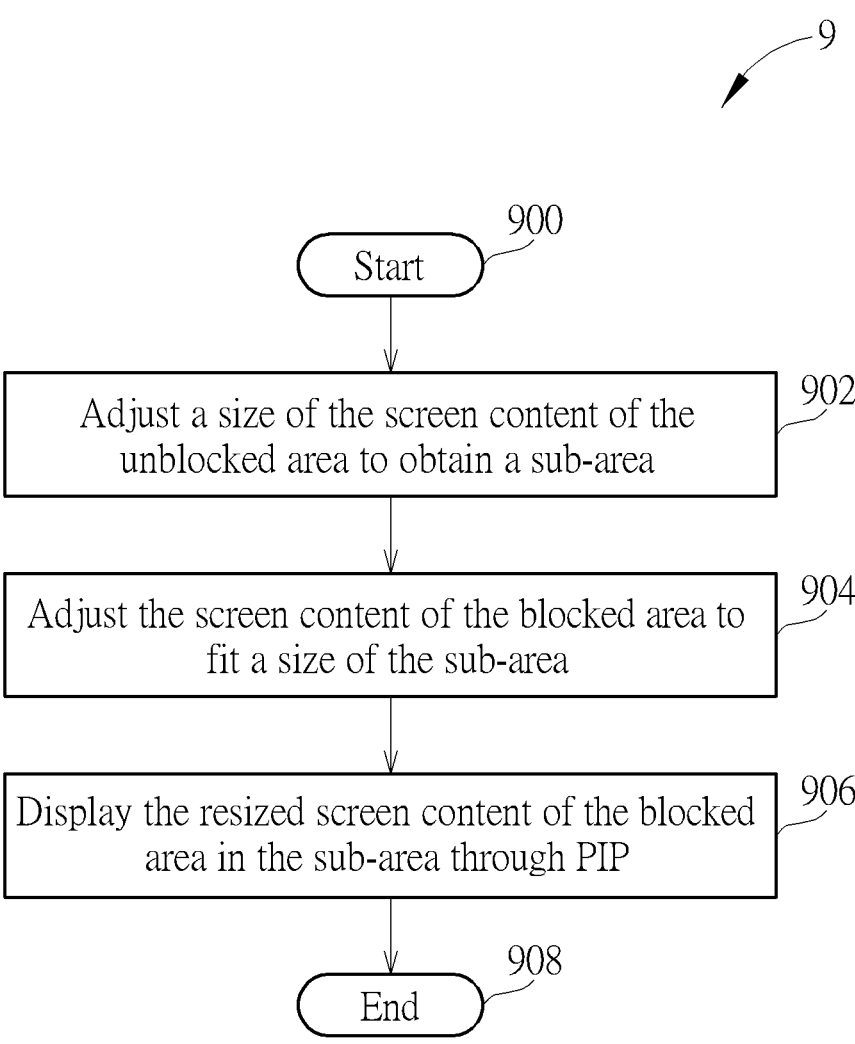
FIG. 9 is a schematic diagram of a screen processing process according to an embodiment of the disclosure.

Please refer to FIG. 9, which is a schematic diagram of a screen processing process 9 according to another embodiment of the disclosure. The screen processing process 9 is used in the touch screen 10 for further processing the screen content when the blocked area is the left area L or the right area R. Compared with the method of copying the full-screen content of the touch screen 10 for processing in Step 602, the screen contents of the blocked area and the unblocked area are processed separately in this embodiment. The screen processing process 9 may be compiled into a program code and stored in the storage unit 108 to be executed by the processing unit 106, which comprises the following steps:

Step 900: Start.

Step 902: Adjust a size of the screen content of the unblocked area to obtain a sub-area.

Step 904: Adjust the screen content of the blocked area to fit a size of the sub-area.

Step 906: Display the resized screen content of the blocked area in the sub-area through PIP.

Step 908: End.

According to the screen processing process 9, the processing unit 106 firstly adjusts (shrinks) the size of the screen content of the unblocked area to spare a sub-area in the unblocked area (Step 902). Next, the processing unit 106 adjusts the size of the screen content of the blocked area to match the size of the sub-area (Step 904). Finally, the resized screen content of the blocked area is displayed in the sub-area through PIP (Step 906).

Specifically, please continue to refer to FIG. 7, which is an embodiment of the processing unit 106 executing the screen processing process 9 when the blocked area is the left area L. As shown in FIG. 7, when the blocked area is the left area L, the unblocked area includes the middle area M and the right area R, and is presented as M+R in FIG. 7. In Step 902, when the screen processing method is the proportional scaling mode, the processing unit 106 maintains the original aspect ratio of the screen content of the unblocked area M+R for uniform scaling into (M+R)' according to a proportion of the unblocked area M+R to an entire screen area L+M+R, in order to spare a sub-area L' and a redundant area B in the unblocked area M+R. In Step 904, the processing unit 106 maintains the original aspect ratio of the screen content of the blocked area L for uniform scaling to the size of the sub-area L' according to a proportion of the blocked area L to the entire screen area L+M+R. In Step 906, the processing unit 106 displays the resized screen content of the blocked area L in the sub-area L' and leaves the redundant area B blank. In Step 902, when the screen processing method is the non-proportional scaling mode, the processing unit 106 performs non-proportional down scaling to the screen content of the unblocked area M+R into (M+R)', so as to spare a sub-area L' in the unblocked area. In this embodiment, the original height of the screen content may be kept, and the screen content of the unblocked area M+R may be adjusted into (M+R)' according to a proportion of a width of the unblocked area M+R to a width of the entire screen area L+M+R, and is not limited thereto. In Step 904, the processing unit 106 performs non-proportional down scaling to the screen content of the blocked area L to match the size of the sub-area L'. In Step 906, the processing unit 106 displays the resized screen content of the blocked area L in the sub-area L'. Accordingly, through PIP, the embodiment of the disclosure may retain the screen content of the blocked area L that the speaker 12 is operating on, to avoid affecting the operation, and at the same time, the screen content of the blocked area L and the screen content of the unblocked area M+R may be displayed in the unlocked area M+R together, so as to ensure that the listener 14 can fully see the screen content projected by the speaker 12 through the touch screen 10.

Please continue to refer to FIG. 8, which is an embodiment of the processing unit 106 executing the screen processing process 9 when the blocked area is the right area R. As shown in FIG. 8, when the blocked area is the right area R, the unblocked area includes the left area L and the middle area M, and is presented as L+M in FIG. 8. In Step 902, when the screen processing method is the proportional scaling mode, the processing unit 106 maintains the original aspect ratio of the screen content of the unblocked area L+M for uniform scaling into (L+M)' according to a proportion of the unblocked area L+M to an entire screen area L+M+R to spare a sub-area R' and a redundant area B in the unblocked area L+M. In Step 904, the processing unit 106 maintains the original aspect ratio of the screen content of the blocked area R for uniform scaling to the size of the sub-area R' according to a proportion of the blocked area R to the entire screen area L+M+R. In Step 906, the processing unit 106 displays the resized screen content of the blocked area R in the sub-area R' and leaves the redundant area B blank. In Step 902, when the screen processing method is the non-proportional scaling mode, the processing unit 106 performs non-proportional down scaling to the screen content of the unblocked area L+M to (L+M)', so as to spare a sub-area R' in the unblocked area. In this embodiment, the original height of the screen content may be kept, and the screen content of the unblocked area L+M may be adjusted to (L+M)' according to a proportion of a width of the unblocked area L+M to a width of the entire screen area L+M+R, and is not limited thereto. In Step 904, the processing unit 106 performs non-proportional down scaling to the screen content of the blocked area R to match the size of the sub-area R'. In Step 906, the processing unit 106 displays the resized screen content of the blocked area R in the sub-area R'. Accordingly, through PIP, the embodiment of the disclosure may retain the screen content of the blocked area R that the speaker 12 is operating on, to avoid affecting the operation, and at the same time, the screen content of the blocked area R and the screen content of the unblocked area L+M may be displayed in the unlocked area L+M together, so as to ensure that the listener 14 can fully see the screen content projected by the speaker 12 through the touch screen 10.

Figure 10:
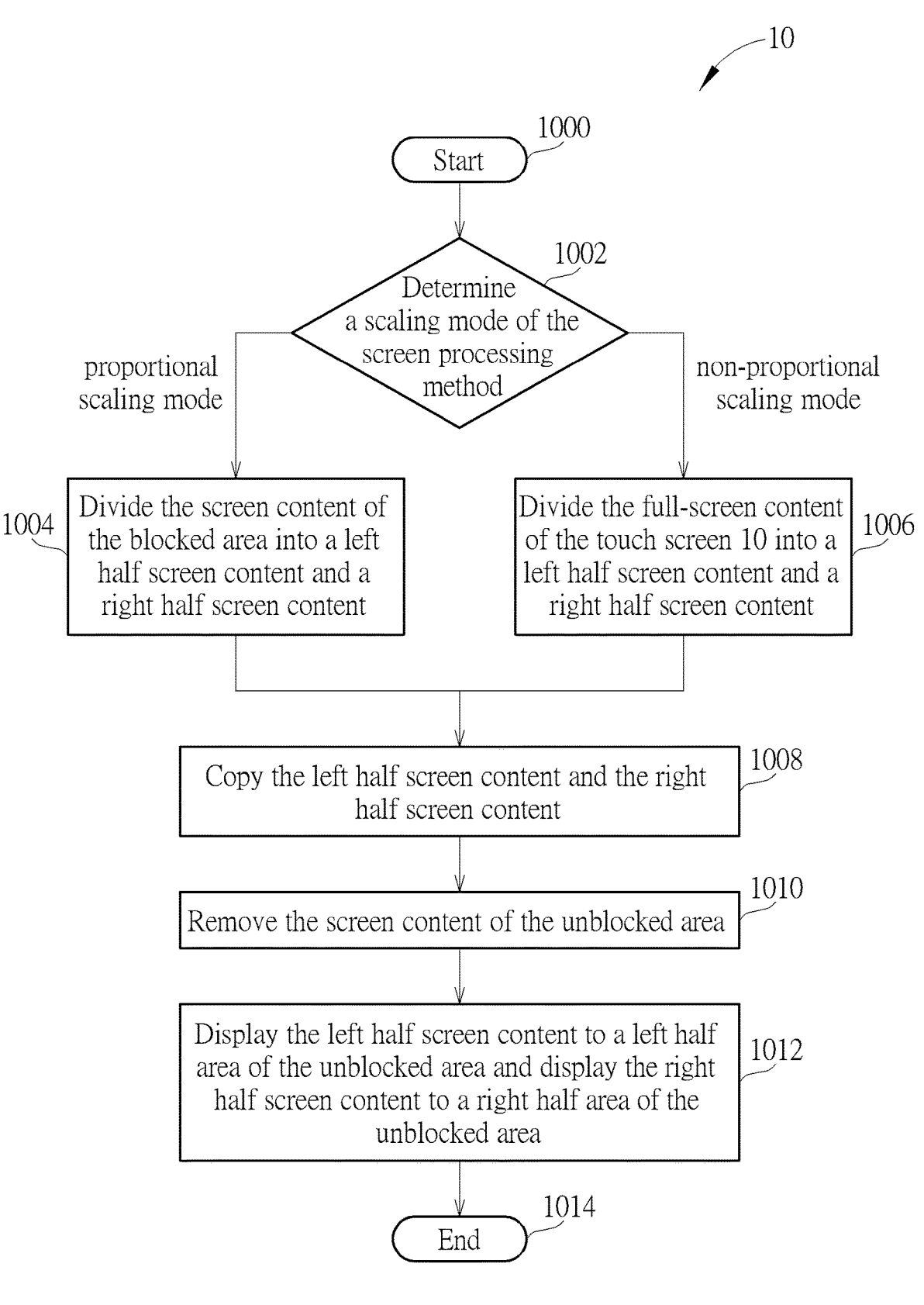
FIG. 10 is a schematic diagram of a screen processing process according to an embodiment of the disclosure.

Moreover, please refer to FIG. 10, which is a screen processing process 10 according to an embodiment of the disclosure. The screen processing process 10 is used in the touch screen 10 for further processing the screen content when the blocked area is the middle area M. The screen processing process 10 may be compiled into a program code and stored in the storage unit 108 to be executed by the processing unit 106, which comprises the following steps:

Step 1000: Start.

Step 1002: Determine a scaling mode of the screen processing method. If the scaling mode is the proportional scaling mode, proceed to Step 1004; if the scaling mode is the non-proportional scaling mode, proceed to Step 1006.

Step 1004: Divide the screen content of the blocked area into a left half screen content and a right half screen content.

Step 1006: Divide the full-screen content of the touch screen 10 into a left half screen content and a right half screen content.

Step 1008: Copy the left half screen content and the right half screen content.

Step 1010: Remove the screen content of the unblocked area.

Step 1012: Display the left half screen content to a left half area of the unblocked area and display the right half screen content to a right half area of the unblocked area.

Step 1014: End.

According to the screen processing process 10, when the blocked area is a middle area M, the processing unit 106 firstly determines a scaling mode of the screen processing method (Step 1002). According to different scaling modes, the processing unit 106 divides the screen content into a left half screen content and a right half screen content (Step 1004 and Step 1006), and copies the left half screen content and the right half screen content to the storage unit 108 (Step 1008). After removing the screen content of the unblocked area (Step 1010), the processing unit 106 displays the left half screen content in a left half area of the unblocked area and display the right half screen content in a right half area of the unblocked area through PIP (Step 1012). It should be noted that the touch screen 10 may be preset to use the proportional scaling mode or the non-proportional scaling mode, where Step 1002 may be skipped and proceed to Step 1004 or Step 1006 according to the preset scaling mode.

Figures 11A, 11B, 11C:
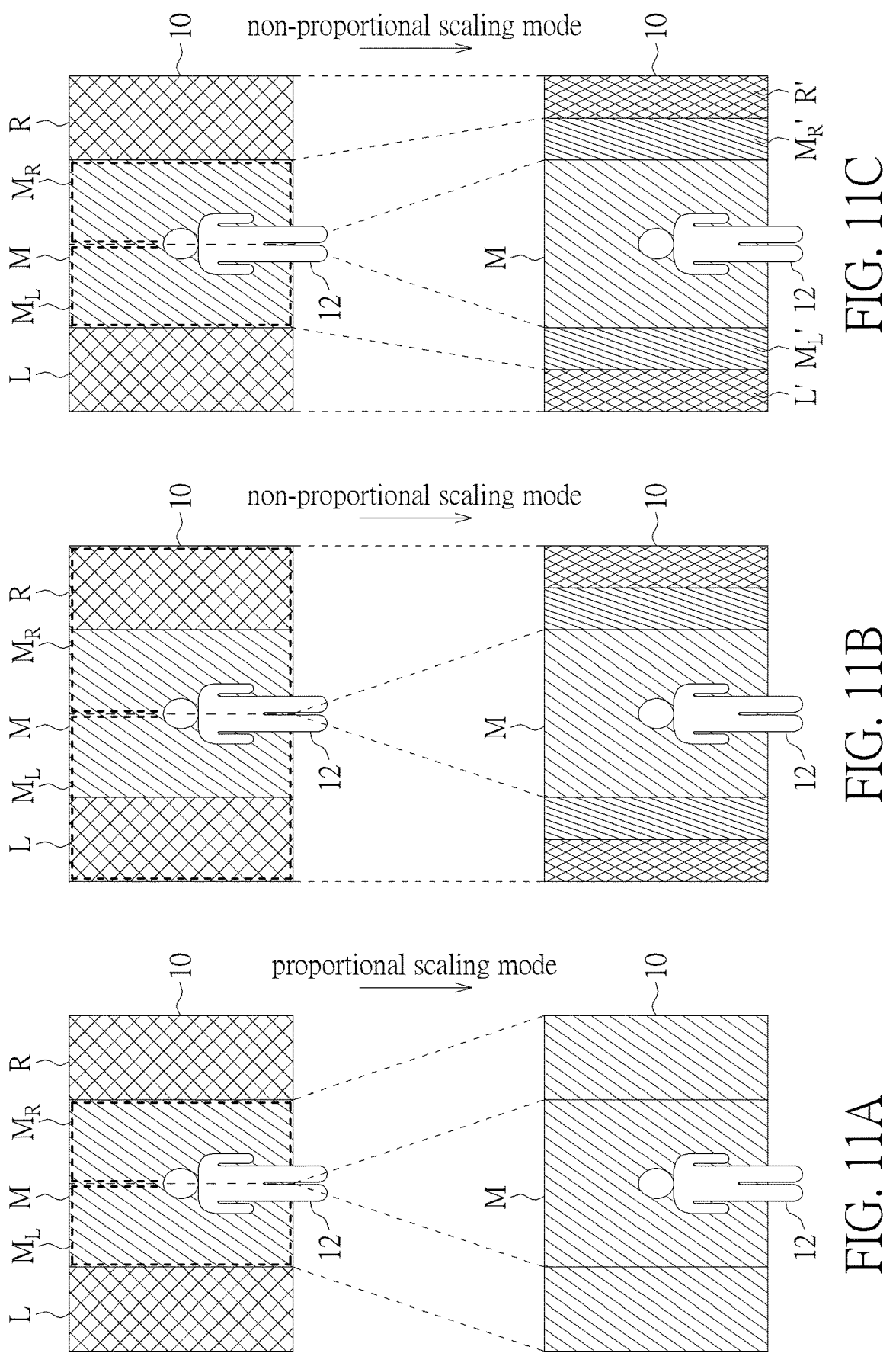

Specifically, please refer to FIG. 11A and FIG. 11B, which are embodiments of the processing unit 106 executing the screen processing process 10 when the blocked area is the middle area M. In this situation, the unblocked area includes the left area L and the right area R, and the screen content of the blocked area M should be displayed by the left area L and the right area R together. FIG. 11A shows the embodiment when the screen processing method is in the proportional scaling mode. As shown in FIG. 11A, the processing unit 106 divides the screen content of the blocked area M into the left half screen content $M_L$ (i.e., the screen content of the left half blocked screen content) and the right half screen content $M_R$ (i.e., the screen content of the right half blocked screen content) according to Step 1004, and displays the left half screen content $M_L$ in the unblock area L and displays the right half screen content $M_R$ in the unblock area R through PIP according to Step 1012. FIG. 11B shows the embodiment when the screen processing method is in the non-proportional scaling mode. As shown in FIG. 11B, the processing unit 106 divides the full-screen content of the touch screen 10 into the left half screen content $M_L$ and the right half screen content $M_R$ according to Step 1006, and displays the left half screen content $M_L$ in the unblock area L and displays the right half screen content $M_R$ in the unblock area R through PIP according to Step 1012. It should be noted, in the non-proportional scaling mode, the left half screen content $M_L$ and the right half screen content $M_R$ should be scaled to match the sizes of the left area L and the right area R respectively in Step 1012, so as to fill up the left area L and the right area R. In addition, a non-linear non-proportional scaling may be adopted to scale the screen content to different degrees in the horizontal direction, and thereby the screen content of the blocked area may be displayed with less scale distortion than the screen content of the unblocked area. Accordingly, the screen content of the blocked area M that the speaker 12 is operating on may be retained to avoid affecting the operation, and at the same time, the screen content of the blocked area M may be displayed in the unlocked area L and the unblocked area M, so as to ensure that the listener 14 can fully see the screen content projected by the speaker 12 through the touch screen 10.

Figure 12:
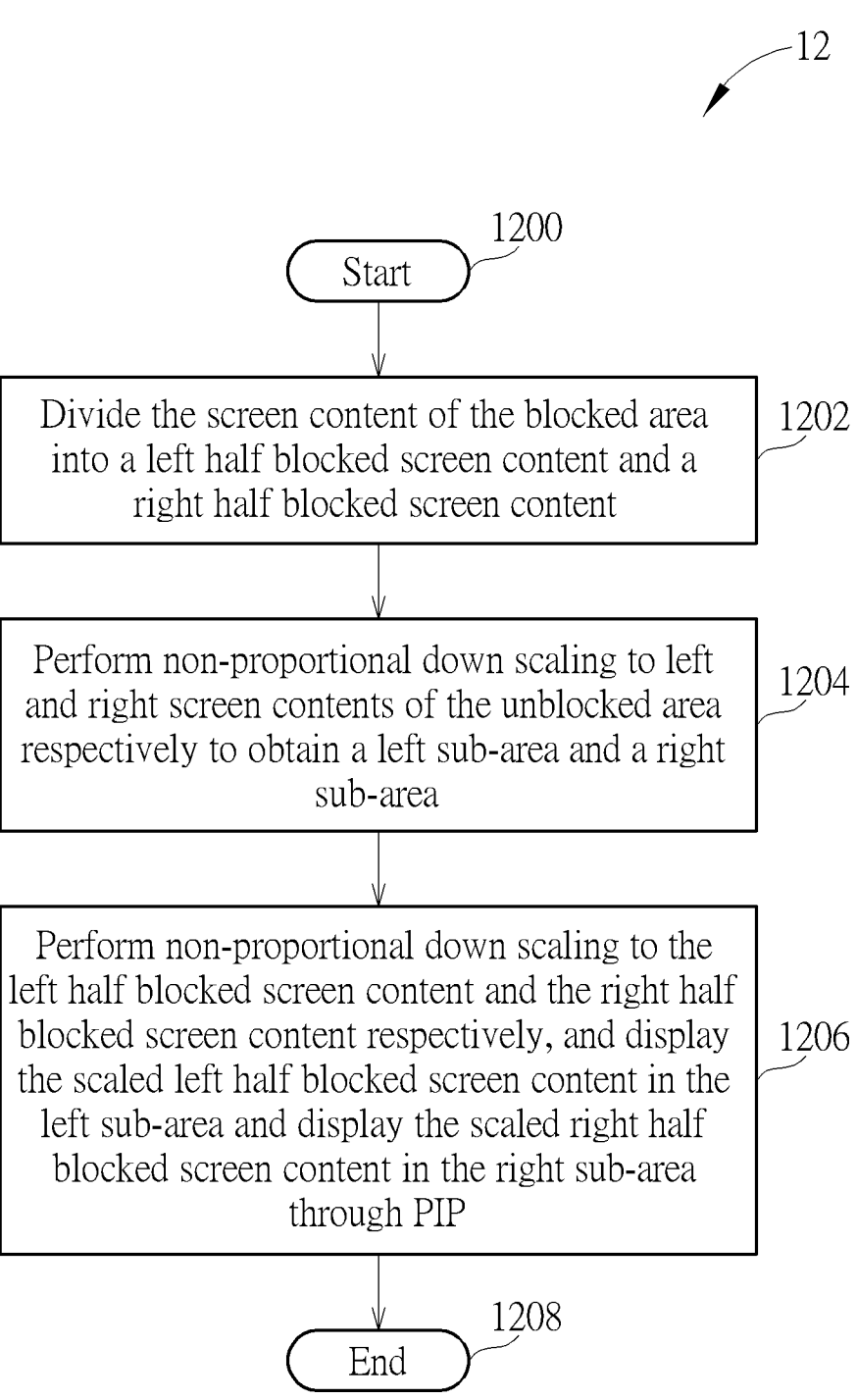
FIG. 12 is a schematic diagram of a screen processing process according to an embodiment of the disclosure.

Please refer to FIG. 12, which is a screen processing process 12 according to another embodiment of the disclosure. The screen processing process 12 is used in the touch screen 10 for further processing the screen content when the blocked area is the middle area M. Compared with the method of processing the screen content of the blocked area and the unblocked area at the same time in Steps 1006-1008, the screen contents of the blocked area and the unblocked area are processed separately in this embodiment. The screen processing process 12 may be compiled into a program code and stored in the storage unit 108 to be executed by the processing unit 106, which comprises the following steps:

Step 1200: Start.

Step 1202: Divide the screen content of the blocked area into a left half blocked screen content and a right half blocked screen content.

Step 1204: Perform non-proportional down scaling to left and right screen contents of the unblocked area respectively to obtain a left sub-area and a right sub-area.

Step 1206: Perform non-proportional down scaling to the left half blocked screen content and the right half blocked screen content respectively, and display the scaled left half blocked screen content in the left sub-area and display the scaled right half blocked screen content in the right sub-area through PIP.

Step 1208: End.

Please refer to FIG. 11C at the same time, which is an embodiment of the processing unit 106 executing the screen processing process 12 when the blocked area is the middle area M. In this situation, the unblocked area includes the left area L and the right area R, and the screen content of the blocked area M should be displayed by the left area L and the right area R together. According to the screen processing process 12, FIG. 11C shows the embodiment when the screen processing method is in the non-proportional scaling mode. The processing unit 106 firstly divides the screen content of the blocked area M into a left half screen content $M_L$ and a right half screen content $M_R$ according to Step 1202. Next, according to Step 1204, the processing unit 106 performs non-proportional down scaling to the screen contents of the left unblocked area L and the right unblocked area R respectively to a left unblocked area L' and a right unblocked area R', so as to spare a left sub-area $M_L'$ in the left unblocked area L and a right sub-area $M_R'$ in the right unblocked area R respectively. Finally, in Step 1206, the processing unit 106 performs non-proportional down scaling to the left half blocked screen content and the right half blocked screen content respectively, and displays the resized left half blocked screen content in the left sub-area $M_L'$ and display the resized right half blocked screen content in the right sub-area $M_R'$ through PIP. It should be noted, in the non-proportional scaling mode, while performing the non-proportional scaling to the screen content in Step 1204 and Step 1206, the height of the original screen content may be kept without adjusting, but is not limited thereto. In this embodiment, a non-linear non-proportional scaling may be adopted to scale the screen content to different degrees in the horizontal direction, and thereby the screen content of the blocked area may be displayed with less scale distortion than the screen content of the unblocked area. Accordingly, the screen content of the blocked area M that the speaker 12 is operating on may be retained to avoid affecting the operation, and at the same time, the screen content of the blocked area M may be displayed in the unlocked area L and the unblocked area M, so as to ensure that the listener 14 can fully see the screen content projected by the speaker 12 through the touch screen 10.

In summary, the touch screen and the image display method of the disclosure may dynamically display the screen content of the area blocked by the speaker in the area not blocked, and thereby overcome the drawbacks of traditional whiteboards, projectors, display devices, etc. Therefore, the listeners can see the complete display content and the quality of meetings, teaching, and speeches may be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image display method for a touch screen, comprising steps of:

capturing an image of an area in front of the touch screen;

determining a position of a speaker user according to the image, and determining a blocked area of the touch screen and an unblocked area of the touch screen according to the position of the speaker user;

down scaling a first screen content of the unblocked area and a second screen content of the blocked area according to the unblocked area; and simultaneously displaying the downscaled first screen content and the downscaled second screen content in the unblocked area;

wherein when the blocked area is determined to be a middle area of the touch screen, the step of down scaling the first screen content of the unblocked area and the second screen content of the blocked area according to the unblocked area comprises:

dividing the second screen content of the blocked area into a left half blocked screen content and a right half blocked screen content; performing non-proportional down scaling to the first screen content of the unblocked area, wherein the unblocked area comprises a left area and a right area of the touch screen;

obtaining a left sub-area in the left area and a right sub-area in the right area; and performing non-proportional down scaling to the left half blocked screen content to fit the left sub-area and the right half blocked screen content to fit the right sub-area.

2. The image display method of claim 1, wherein when the blocked area is determined to be one of the left area or the right area of the touch screen, the step of down scaling the first screen content of the unblocked area and the second screen content of the blocked area according to the unblocked area comprises:

performing non-proportional down scaling to the first screen content of the unblocked area, wherein the unblocked area comprises the middle area and the other one of the left area or the right area; obtaining a sub-area in the unblocked area; and performing non-proportional down scaling to the second screen content of the blocked area to fit the sub-area.

3. The image display method of claim 2, wherein the step of simultaneously displaying the downscaled first screen content and the downscaled second screen content in the unblocked area comprises:

displaying the non-proportional downscaled second screen content of the blocked area in the sub-area.

4. The image display method of claim 1, wherein when the blocked area is determined to be one of the left area or the right area of the touch screen, the step of down scaling the first screen content of the unblocked area and the second screen content of the blocked area according to the unblocked area comprises:

performing proportional down scaling to the first screen content of the unblocked area according to a proportion of the unblocked area to the touch screen, wherein the unblocked area comprises the middle area and the other one of the left area or the right area;

obtaining a sub-area in the unblocked area; and performing proportional down scaling to the second screen content of the blocked area according to a proportion of the blocked area to the touch screen to fit the sub-area.

5. The image display method of claim 4, wherein the step of simultaneously displaying the downscaled first screen content and the downscaled second screen content in the unblocked area comprises:

displaying the proportional downscaled second screen content of the blocked area in the sub-area and leaving a redundant area in the unblocked area blank.

6. The image display method of claim 1, wherein when the blocked area is determined to be the middle area of the touch screen, the step of simultaneously displaying the downscaled first screen content and the downscaled second screen content in the unblocked area comprises:

displaying the non-proportional downscaled left half blocked screen content in the left sub-area and displaying the non-proportional downscaled right half blocked screen content in the right sub-area.

7. A display device, comprising:

an image capturing unit, configured to capture an image in front of the display device;

an image display unit; and a processing unit, coupled to the image capturing unit and the image display unit, configured to determine a position of a speaker user according to the image;

determine a blocked area and an unblocked area of the image display unit according to the position of the speaker user;

down scale a first screen content of the unblocked area and a second screen content of the blocked area according to the unblocked area; and simultaneously display the downscaled first screen content and the downscaled second screen content in the unblocked area;

wherein when the blocked area is determined to be one of a left area or a right area of the image display unit, the down scaling the first screen content of the unblocked area and the second screen content of the blocked area according to the unblocked area comprises:

performing proportional or non-proportional down scaling to the first screen content of the unblocked area, wherein the unblocked area comprises a middle area of the image display unit and the other one of the left area or the right area;

obtaining a sub-area in the unblocked area; and performing proportional or non-proportional down scaling to the second screen content of the blocked area to fit the sub-area.

8. The display device of claim 7, wherein when the blocked area is determined to be the middle area of the image display unit, the down scaling the first screen content of the unblocked area and the second screen content of the blocked area according to the unblocked area comprises:

dividing the second screen content of the blocked area into a left half blocked screen content and a right half blocked screen content;

performing non-proportional down scaling to the first screen content of the unblocked area, wherein the unblocked area comprises the left area and the right area;

obtaining a left sub-area in the left area and a right sub-area in the right area; and performing non-proportional down scaling to the left half blocked screen content to fit the left sub-area and the right half blocked screen content to fit the right sub-area.

9. The display device of claim 8, wherein the simultaneously displaying the downscaled first screen content and the downscaled second screen content in the unblocked area comprises:

displaying the non-proportional downscaled left half blocked screen content in the left sub-area and displaying the non-proportional downscaled right half blocked screen content in the right sub-area.

10. The display device of claim 7, wherein when the blocked area is determined to be one of the left area or the right area of the image display unit and when performing non-proportional down scaling, the simultaneously displaying the downscaled first screen content and the downscaled second screen content in the unblocked area comprises:

displaying the non-proportional downscaled second screen content of the blocked area in the sub-area.

11. The display device of claim 6, wherein when the blocked area is determined to be one of the left area or the right area of the image display unit and when performing proportional down scaling, the simultaneously displaying the downscaled first screen content and the downscaled second screen content in the unblocked area comprises:

displaying the proportional downscaled second screen content of the blocked area in the sub-area and leaving a redundant area in the unblocked area blank.

12. A display device, comprising:

an image capturing unit, configured to capture an image in front of the display device;

an image display unit; and a processing unit, coupled to the image capturing unit and the image display unit, configured to:

determine a position of a speaker user according to the image;

divide a screen of the image display unit into a left area, a middle area, and a right area;

determine that one of the left area, the middle area, or the right area is a blocked area according to the position of the speaker user, and determine that the others of the left area, the middle area, or the right area are unblocked areas;

down scale first screen contents of the unblocked areas and a second screen content of the blocked area according to the unblocked areas, and simultaneously display the downscaled first screen contents and the downscaled second screen content in the unblocked areas.

13. The display device of claim 12, wherein when the blocked area is the middle area, the down scaling the first screen contents of the unblocked areas and the second screen content of the blocked area according to the unblocked areas comprises:

dividing the second screen content of the blocked area into a left half blocked screen content and a right half blocked screen content;

performing non-proportional down scaling to the first screen contents of the unblocked areas;

obtaining a left sub-area in the left area and a right sub-area in the right area; and performing non-proportional down scaling to the left half blocked screen content to fit the left sub-area and the right half blocked screen content to fit the right sub-area;

wherein the non-proportional downscaled left half blocked screen content is displayed in the left sub-area, and the non-proportional downscaled right half blocked screen content is displayed in the right sub-area.

14. The display device of claim 12, wherein when the blocked area is the left area or the right area, the down scaling the first screen contents of the unblocked areas and the second screen content of the blocked area according to the unblocked areas comprises:

performing non-proportional down scaling to the first screen contents of the unblocked areas;

obtaining a sub-area in the unblocked areas; and performing non-proportional down scaling to the second screen content of the blocked area to fit the sub-area;

wherein the non-proportional downscaled second screen content of the blocked area is displayed in the sub-area.

15. The display device of claim 12, wherein when the blocked area is the left area or the right area, the down scaling the first screen contents of the unblocked areas and the second screen content of the blocked area according to the unblocked areas comprises:

performing proportional down scaling to the first screen-content contents of the unblocked areas according to a proportion of the unblocked areas to the image display unit;

obtaining a sub-area in the unblocked areas; and performing proportional down scaling to the second screen content of the blocked area according to a proportion of the blocked area to the image display unit to fit the sub-area;

wherein the proportional downscaled second screen content of the blocked area is displayed in the sub-area, and a redundant area in the unblocked areas is left blank.

* * * * *